United States Patent
Proffitt et al.

(10) Patent No.: US 7,287,709 B2
(45) Date of Patent: Oct. 30, 2007

(54) CONFIGURABLE MULTI-LEVEL THERMOSTAT BACKLIGHTING

(75) Inventors: Jerry L. Proffitt, Wabash, IN (US); Michael Roher, Fort Wayne, IN (US); William F. Van Ostrand, Indianapolis, IN (US)

(73) Assignee: Carrier Corporation, Syracuse, NY (US)

( * ) Notice: Subject to any disclaimer, the term of this patent is extended or adjusted under 35 U.S.C. 154(b) by 259 days.

(21) Appl. No.: 10/946,380

(22) Filed: Sep. 21, 2004

(65) Prior Publication Data

US 2006/0060658 A1 Mar. 23, 2006

(51) Int. Cl.
*G05D 23/00* (2006.01)

(52) U.S. Cl. .......... 236/94; 62/126; 165/11.1; 340/815.75

(58) Field of Classification Search .......... 62/125, 62/126, 127, 129, 130; 236/94; 165/11.1, 165/11.2; 340/468, 469, 815.75
See application file for complete search history.

(56) References Cited

U.S. PATENT DOCUMENTS

| | | | | |
|---|---|---|---|---|
| 3,781,852 A | * | 12/1973 | White et al. | 345/169 |
| 5,644,290 A | * | 7/1997 | Rhodes | 340/468 |
| 6,164,374 A | | 12/2000 | Rhodes et al. | |
| 6,435,418 B1 | | 8/2002 | Toth et al. | |
| 6,507,286 B2 | * | 1/2003 | Weindorf et al. | 340/815.75 |
| 6,641,054 B2 | | 11/2003 | Morey | |
| 6,726,112 B1 | | 4/2004 | Ho | |
| 2003/0073412 A1 | * | 4/2003 | Meade, II | 455/70 |
| 2005/0192063 A1 | * | 9/2005 | Brubacher-Cressman et al. | 455/574 |

* cited by examiner

*Primary Examiner*—Marc Norman
(74) *Attorney, Agent, or Firm*—Carlson, Gaskey & Olds

(57) ABSTRACT

A thermostat includes a display and an illumination device that is configurable to illuminate the display in a partial illumination mode and a full illumination mode. In the partial illumination mode the illumination device generates a light intensity sufficient to review the settings of the thermostat without generating heat of a sufficient amount to disrupt thermostat measurements. The full illuminated condition is actuated upon interaction with the thermostat. Once interaction with the thermostat is completed the illumination device thermostat returns to the partially illuminated condition.

13 Claims, 5 Drawing Sheets

CONFIGURABLE MULTI-LEVEL THERMOSTAT BACKLIGHTING

BACKGROUND OF THE INVENTION

This invention relates to thermostats. More particularly this invention relates to a thermostat including configurable multi-level backlighting.

Typically a thermostat is provided for controlling a heating and cooling system within a building. The thermostat selectively actuates the heating and cooling system to provide a desired temperature. Conventional thermostats include a temperature sensitive device for indicating the temperature and activating the heating and cooling system. Typically, such devices are sensitive to relatively small changes of temperature.

A known feature for a thermostat is to include a backlight display such that the thermostat can be read and adjusted at night without turning on lights. Typically, the backlight is either continuously on, or is actuated at the first touch of a button on the thermostat and maintained for a reasonable amount of time following the release of the button. Both configurations have certain disadvantages. Continuous backlighting generates heat that can affect the accuracy of the temperature-sensing device within the thermostat. Backlighting that engages when a control button is pushed prevents the simple monitoring of the thermostat without interacting with the thermostat. Additionally, actuating lighting in response to a button being pressed complicates the programming and operation of the thermostat. Determining whether an operator merely wishes to observe current conditions, or actually change a setting complicates programming and most often results in a compromise that does not fully accommodate either instance fully.

For these reasons, it is desirable to develop a thermostat that includes configurable lighting that does not adversely affect thermostat functions.

SUMMARY OF THE INVENTION

This invention is a thermostat including configurable multi-level lighting. The thermostat assembly of this invention includes a display device that is illuminated according to several specific modes. The illumination modes include a non-illuminated mode, a partial illumination mode and a full illumination mode.

The partial illumination mode illuminates the display device to a degree that allows a user to observe current settings of the thermostat without having to interact with a user interface. This partial illumination mode provides minimal heating of the thermostat that minimizes any possible detrimental effects to the accuracy of the thermostat. Further, the partial illumination mode allows the thermostat to be read from a distance even in poor conditions such as a darkened room at night.

The desired illumination mode is fully configurable and selectable by the user such that the thermostat can go completely dark or be left in a partially illuminated mode. The thermostat can be operated with a default condition including the partial illumination mode where the thermostat remains partially illuminated until a user interacts with a user interface. In response to actuation the user interface, the display device will switch to full illumination. Further, the thermostat of this invention also provides a no-illumination mode. While in the no-illumination default mode, the first interaction with the user interface triggers full illumination of the display device.

Accordingly, the thermostat assembly of this invention includes a display device that is illuminated according to user selectable criteria to allow review of thermostat settings without interaction.

These and other features of the present invention can be best understood from the following specification and drawings, the following of which is a brief description.

DETAILED DESCRIPTION OF THE PREFERRED EMBODIMENT

Figure 1:
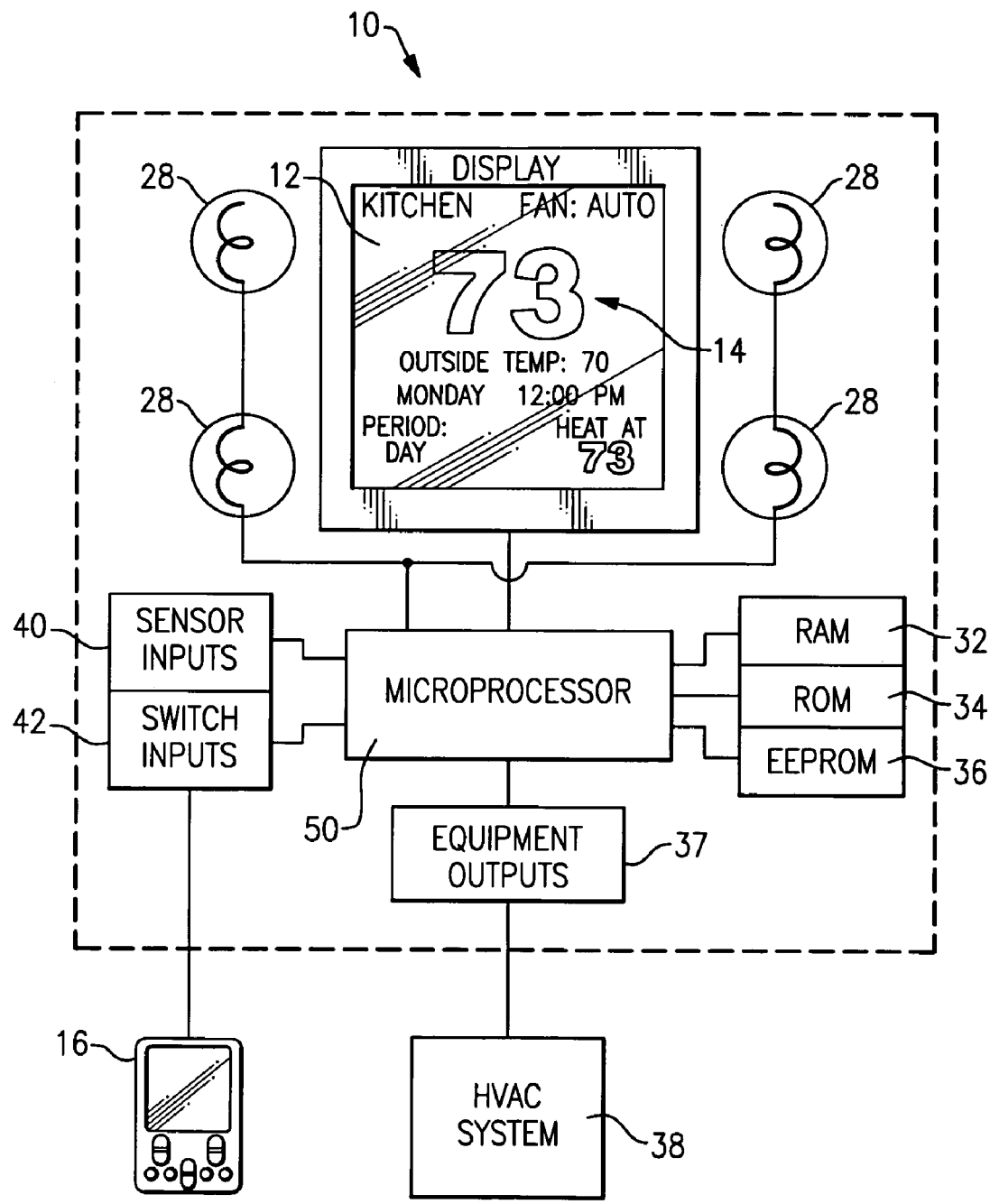
FIG. 1 is a schematic view of the component parts of the thermostat.

Referring to FIG. 1, a thermostat 10 includes a display device 12 that provides operational information 14 such as temperature, set point, and additional information relevant to operation of a heating and cooling system 38. Although, a thermostat 10 is shown and discussed by way of example, a worker with the benefit of this disclosure would understand the application of this invention to other display devices such as for example a security control panel, or a keyless entry device. The thermostat 10 includes an illumination device 28 for lighting the display device 12 during low light conditions. The illumination device 28 of the example thermostat is a Light Emitting Diode (LED), however other known illumination devices are also within the contemplation of this invention. The illumination device 28 of this invention operates according to different and configurable modes with differing and selectable illumination levels.

The example display device 12 is a liquid crystal display device LCD as is known, however, a worker versed in the art with the benefit of this disclosure would understand the application to other types of display devices. The display device 12 includes temperature information along with other information on the status of the heating and cooling equipment that is controlled by the thermostat 10. Such information can include the current temperature, time, set temperature, whether the heating and cooling equipment is operating and the location of the thermostat.

The thermostat 10 includes a microprocessor 30 that is programmed to operate the heating and cooling system 38. The microprocessor 30 communicates with sensors 40 to obtain temperature information. A series of switch inputs 42 communicate instructions input through a user interface 16. The microprocessor 30 is further supported by a random access memory 32, a read only memory 34 and an erasable programmable read-only memory 36. The component parts of the thermostat 10 are illustrated schematically and a worker versed in the art would recognize that other configurations for a thermostat are within the contemplation of this invention.

Figure 2:
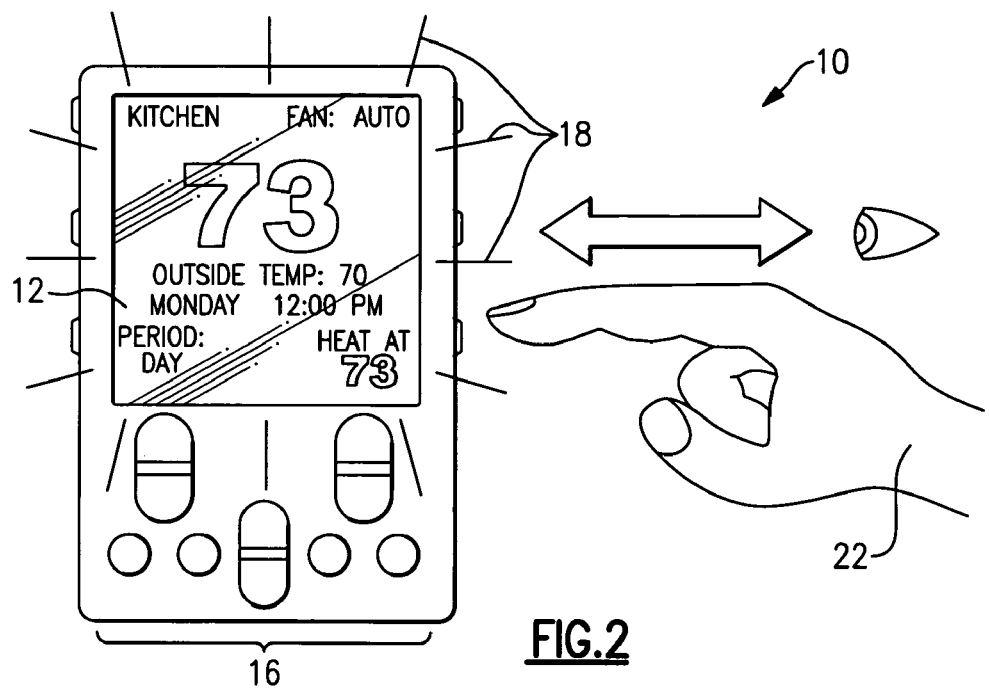
FIG. 2 is a schematic view of a thermostat only partially illuminated.

Referring to FIG. 2, the thermostat 10 is shown schematically with the display device 12 illuminated by the illumination device 28 in a partially illuminated mode schematically shown by lines 18. In the partially illuminated mode 18 the display device 12 can be viewed without interacting with any of the user interface controls 16. A user 22 is therefore able to determine and review the thermostat setting in a darkened environment a distance from the thermostat 10. Further, the partially illuminated mode 18 provided by this invention generates substantially low levels of heat that does not affect thermostat operation.

Figure 3:
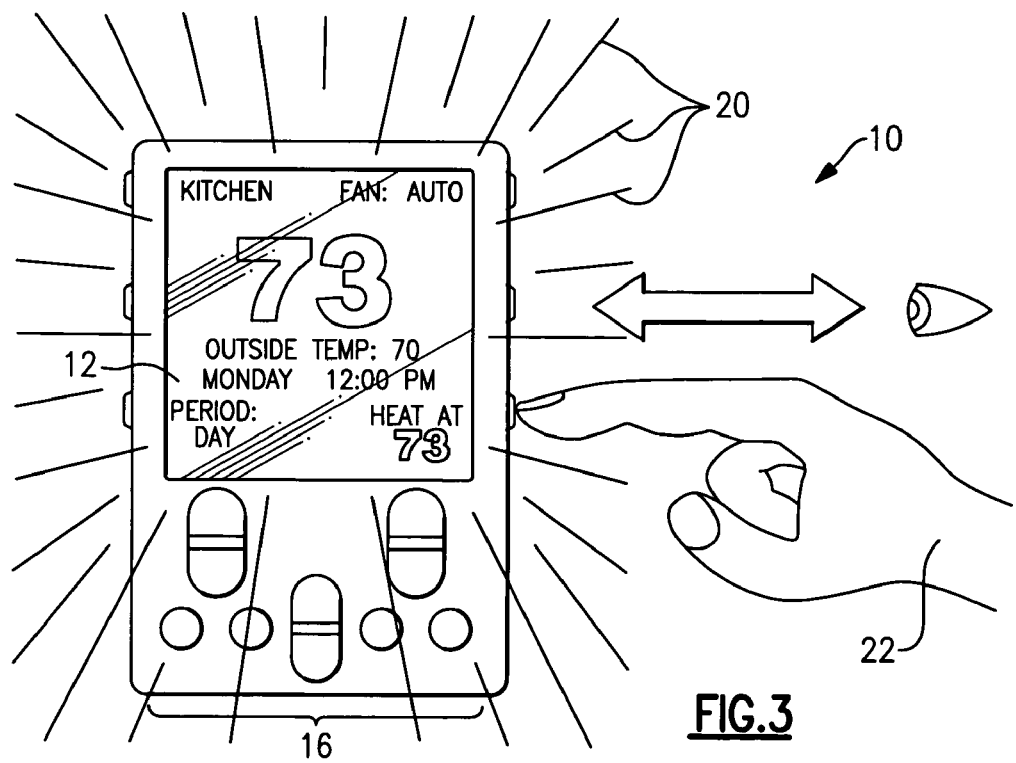
FIG. 3 is a schematic view of a thermostat fully illuminated.

Referring to FIG. 3, the thermostat 10 is shown in a fully illuminated state schematically shown by lines 20. This is a full-illumination mode 20 where the illumination device 28 provides illumination greater than the partially illuminated condition, but only after actuation of the user interface 16 is detected. The full illumination mode 20 provides for the actuation of the illumination device 28 in response to actuation of the user interface 16. Without user input, the normal or default condition of the illumination device 28 is off or no-illumination. In the example thermostat 10, the full illumination mode 20 actuates the illumination device 28 to provide maximum illumination responsive to use of the user interface 16. However, other illumination levels are within the scope of this invention. As appreciated, the illumination provided in the partial illumination condition and the full illumination condition is configurable and selectable by the user.

Full illumination of the display device 12 is initiated once the user interface control 16 is actuated by the user 22. At such time as interaction is detected, the display device 12 is fully illuminated according to the full illumination mode 20. Once interaction with the user interface 16 has terminated for a sufficient wait period the fully illuminated condition is ended and the display device 12 is no longer illuminated. That is once the user 22 has completed programming or adjusting the parameters of the thermostat 10, the illumination device 28 is simply turned off after a predetermined time. As appreciated, if interaction is required to cause actuation of the illumination device 28 it is not possible to view thermostat settings in a darkened environment until the user interface 16 is engaged. In some instances it is desirable to operate the thermostat in a mode where the display device 12 is not illuminated.

The example thermostat 10 has been described with a partially illuminated condition as one of two default conditions. The partially illuminated condition and the fully illuminated condition provide different light levels relative to one another. Further although two light modes are described, the levels of light emitted onto the display device 12 can vary as desired. The light level for the partially illuminated condition can include a plurality of modes and light levels. Further, the fully illuminated condition as pertains to this description and this invention is a light level greater than that of the partially illuminated condition and may also be varied as is desired according to application specific requirements.

Figure 4:
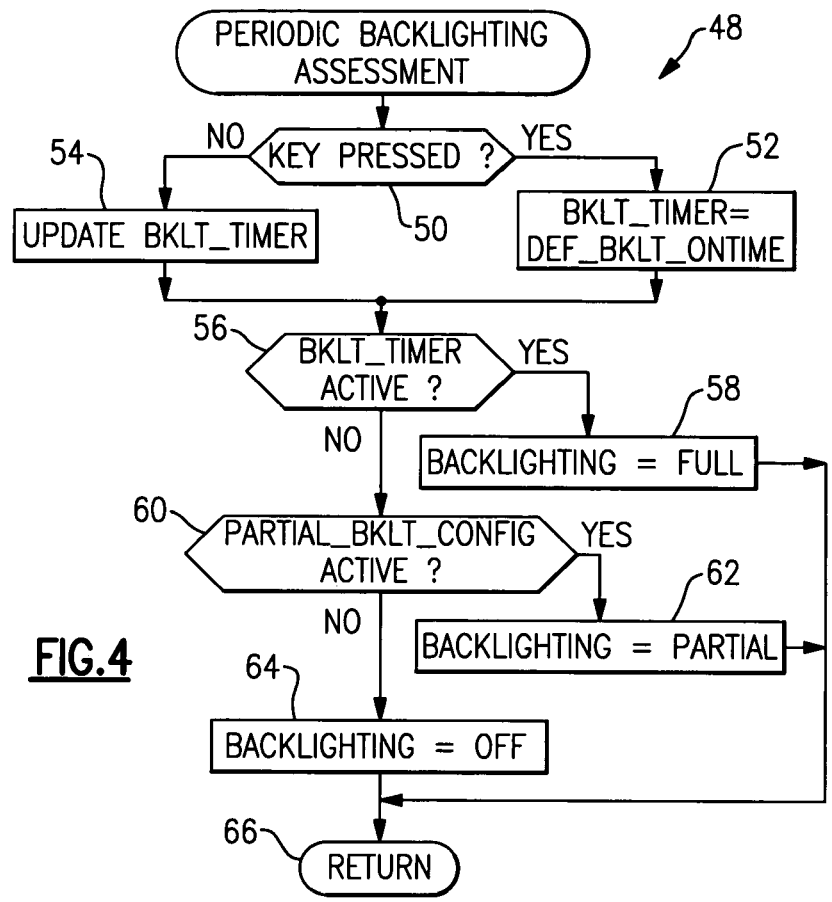
FIG. 4 is a flow diagram illustrating the steps of periodic assessment of the backlight level.

Referring to FIG. 4, operation of the thermostat 10 occurs as is shown in the flow diagram illustrated at 48. The diagram 48 illustrates the process by which the microprocessor 30 operates the configurable illumination of the example thermostat 10. This set of decisions and actions is repeated consecutively during operation of the thermostat 10. An assessment begins with determining whether a key of the user interface controls 16 has been pressed as is indicated at 50. If a key has been pressed or any other user interface controls 16 have been pressed, the backlight timer will be initiated as is shown at step 52 and the illumination device 28 turned on. The backlight timer maintains illumination for a specific wait period responsive to interaction with the user interface control 16. The backlight timer will turn off the illumination device after a predetermined wait period once no interaction with the user interface 16 is detected. However, it the user interface 16 is actuated again the wait period is renewed. If operation continues the timer is continually reset. It is only after interaction with the user interface controls 16 stops that the wait period expires and operation proceeds to return the illumination device 28 to the default condition.

If no interaction with the user interface is detected, the wait period does not begin and the illumination device 28 remains off as indicated at step 54. An indication of the current state of the back light timer is determined as is indicated at 56. If the backlight timer is active, the illumination device 28 will be engaged to the fully illuminated condition as is schematically indicated at 58. If the backlight timer is not actuated, a determination of whether the partial illumination mode 18 has been set as the default condition is made as schematically indicated at 60.

When the backlight timer is no longer active the microprocessor 30 determines what the current programmed default condition is and returns the illumination device 28 to the desired condition. If the partial illumination mode 18 is set then the illumination device 28 will return to the partially illuminated condition as is indicated at 62. If no backlighting is indicated and no illumination is the default condition, the illumination device is turned off as indicated at 64.

Once the default condition is restored, the thermostat 10 begins the process 48 again from the return block 66. In this way the microprocessor 30 of the thermostat 10 constantly updates the condition of the illumination device 28.

Figure 5:
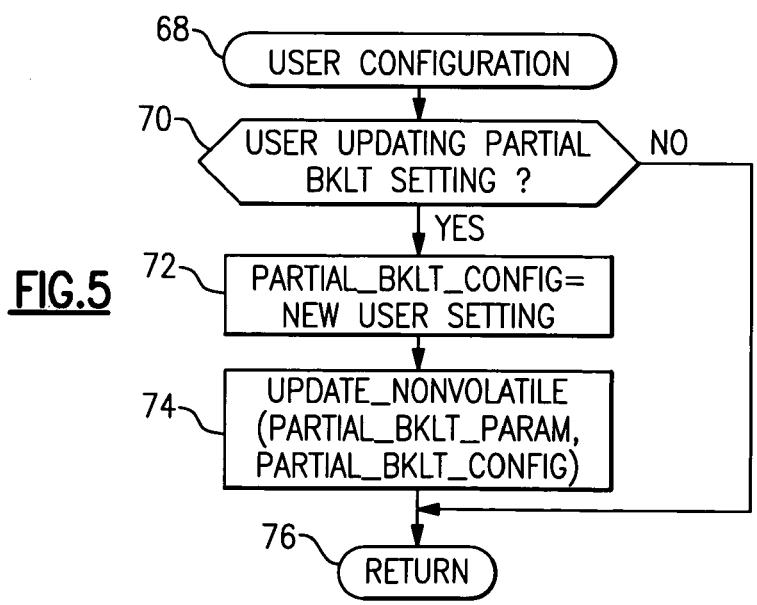
FIG. 5 is a flow diagram illustrating initial user configuration of the backlight level.

Referring to FIG. 5, the thermostat 10 is initially set at a default setting where the illumination device 28 will fully illuminate the display device 12 for a predetermined amount of time. Full illumination is initially actuated because programming most often will follow initial installation of the thermostat 10. During initial installation the user 22 will select a default lighting mode for the thermostat 10. The initial user configuration is schematically shown at 68.

The microprocessor 30 queries whether the initial backlighting setting has been initiated as is indicated by the decision block 70. If the partial illumination mode 18 has been indicated it will proceed to the partial backlighting configuration with the new user setting as is indicated by block 72. Then the microprocessor 30 will store the current selected modes within memory such that the memory reflects that the partial illumination mode 18 has been set by the user as the desired default condition as is schematically shown at block 74. A return 76 provides for continually updating to consider subsequent changes made by the user 22.

Figure 6:
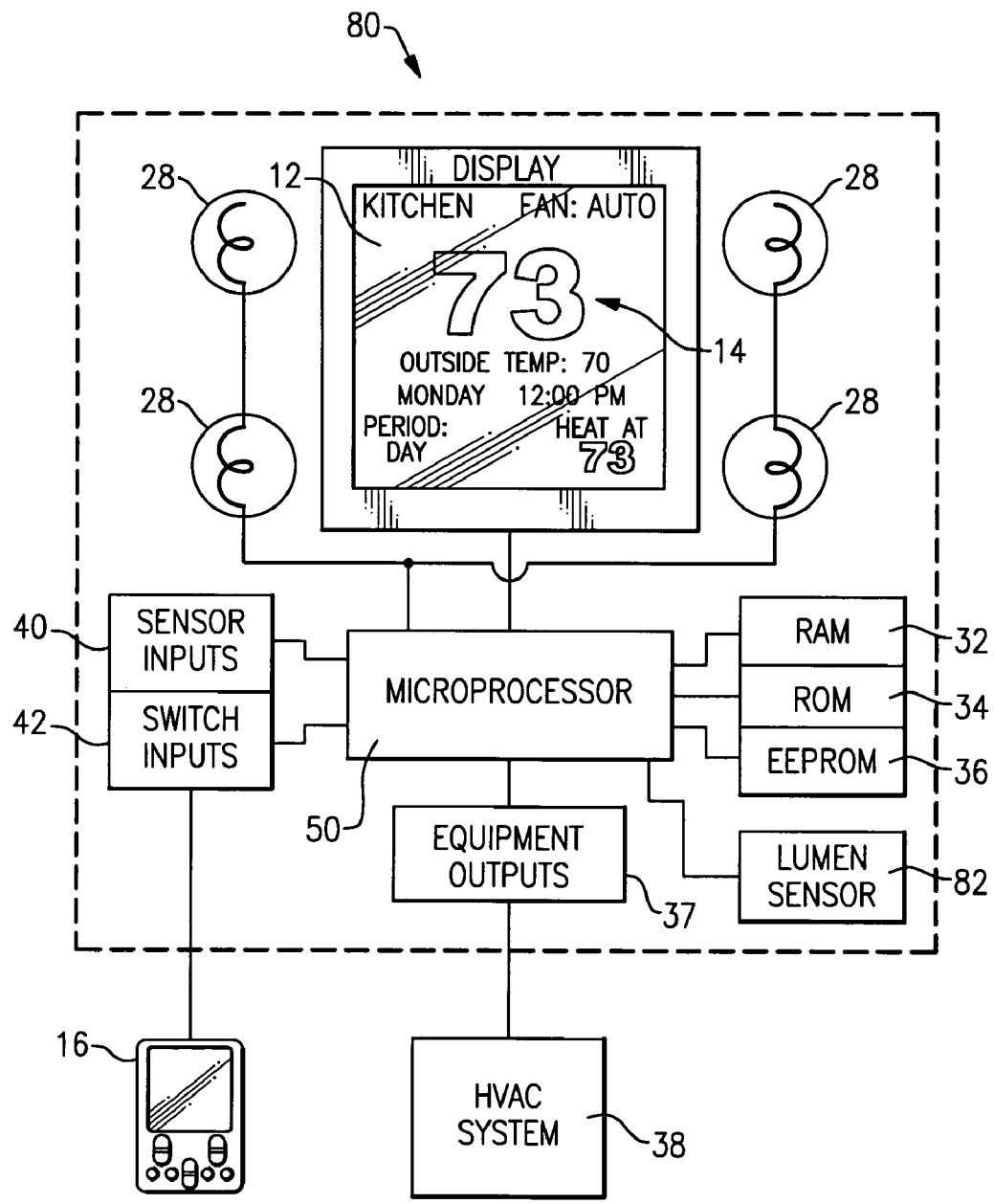
FIG. 6, is a schematic view of another thermostat according to this invention including a Lumen sensor.

Referring to FIG. 6, another thermostat 80 according to this invention includes a lumen sensor 82. The lumen sensor 82 detects a level of lighting within a room or the surrounding environment. The lumen sensor 82 is as known, and provides a signal indicative of a light level surrounding the thermostat 80. As appreciated, in some conditions, lighting of the thermostat display device is not necessary, such as during the day, or when the surrounding area is illuminated by other lights. Accordingly, operation of the thermostat 80 can be adjusted in accordance with current lighting conditions. Operation of the thermostat 80 according to the partial illumination mode 18 and the full illumination mode 20 is then modified according to light levels detected by the lumens sensor 82.

Figure 7:
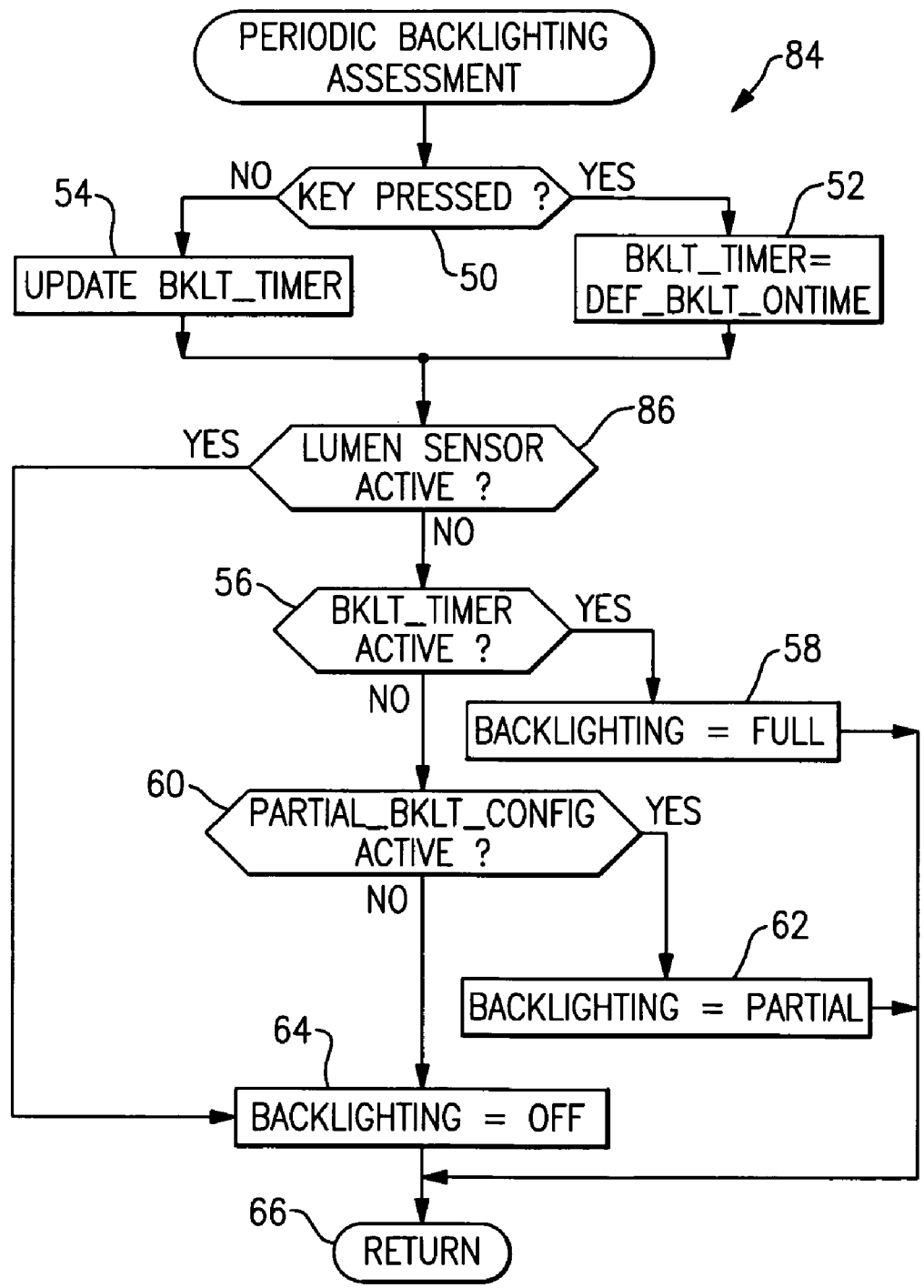
FIG. 7 is a flow diagram illustrating the steps of periodic assessment of the backlight level with the Lumen sensor.

Referring to FIG. 7, a block diagram 84 illustrates operation responsive to detection of light conditions with the lumen sensor 82. In a darkened environment, operation would proceed normally according to the pre-selected default condition. However, operation is modified to account for a surrounding light level. In response to the lumens sensor 82 detecting light above a predetermined threshold value as is indicted by decision block 86, the illumination device is turned off.

Further, if the lumen sensor 82 detects light above the threshold value, the partial illumination condition can be deactivated. Once the light level drops below the threshold value, the lumen sensor no longer is active and partial illumination condition is engaged according to predetermined criteria. As appreciated, operation of the illumination device 28 with a lumens sensor 82 can include other modes of operation according to desired criteria, such as adjusting a level of illumination in a variable manner according to light levels surrounding the thermostat 10. Such operation may include increasing illumination in a lighted room to provide for greater contrast on the display device 12, or lowering the light levels for both the fully illuminated condition and the partially illuminated condition for low light conditions required less contrast to read the display device 12. A worker with the benefit of this disclosure will recognize that other operating modes utilizing the lumens sensor 82 are within the scope and contemplation of this invention.

The thermostat 10 of this invention includes a configurable illumination device 28 that provides the user with selectable illumination modes. In the partially illuminated mode 18 the display device 12 is illuminated to a level that allows for viewing of thermostat information while not generating sufficient heat as to disrupt measurement of current ambient conditions. Further, upon actuation of any of the user interface control 16 the illumination device 28 actuates to full illumination mode to provide the user full visibility during the setting of desired parameters. However, once the user has completed any changes to the thermostat parameters the illumination device 28 returns to the partially illuminated default condition.

In the partially illuminated condition the user can review the status of the thermostat without engaging the thermostat. Further, the partially illuminated mode 18 provides a nightlight to provide sufficient illumination in which to monitor the thermostat and walk through a darkened room without the need of turning other lighting.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A thermostat assembly comprising:
a display for communicating information;
an illumination device for illuminating said display, said illumination device actuatable between a non-illuminated mode, a partially illuminated mode and a fully illuminated mode;
a controller operating said illumination device according to one of said non-illuminated mode, said fully illuminated mode; and said partially illuminated mode; and
a user interface for adjusting a thermostat parameter including a means for setting a desired illumination mode, wherein operation of said illumination device in said partially illuminated mode comprises changing from a partial light level to a full light level in response to actuation of said user interface, and returning to said partial light level responsive to a desired event.

2. The assembly as recited in claim 1, wherein said display comprises a liquid crystal display device.

3. The assembly as recited in claim 2, wherein said illumination device comprises a backlight.

4. The assembly as recited in claim 1, wherein said full light level continues for a desired time after actuation of said user interface.

5. The assembly as recited in claim 1, wherein said partially illuminated mode comprises partially illuminating said display without activation of said user interface.

6. The assembly as recited in claim 1, including a lumens sensor for sensing a light level.

7. The assembly as recited in claim 6, wherein said illumination device illuminates said display responsive to a light level detected by said lumens sensor.

8. A method of illuminating a thermostat comprising the steps of:
a. selecting between a partially illuminated mode and a fully illuminated mode of an illumination device for illuminating a display, wherein the illumination device and the display are components of the thermostat; and
b. illuminating said display according to said partially illuminated mode by illuminating the display at a partial light level below a full light level, increasing the light level to the full light level responsive to user interaction with a user interface, and returning to the partial light level after a desired event.

9. The method as recited in claim 8, wherein said desired event comprises no interaction with said user interface for a desired wait period.

10. The method as recited in claim 8, wherein said fully illuminated mode comprises no illumination of said display until interaction with said user interface, full illumination during interaction with said user interface and resuming no illumination of said display responsive to no interaction with said user interface for a desired wait period.

11. The method as recited in claim 8, including the step of detecting a light level surrounding said thermostat, and illuminating said display responsive to a detected light level.

12. A system control panel assembly comprising:
a display means for displaying information relating to operation of a system;
an illumination means for illuminating said display means according to a non-illumination mode, a partially illuminated mode and a fully illuminated mode;
a control means for adjusting said illumination means between said non-illuminated mode, said fully illuminated mode, and said partially illuminated mode; and
a user interface for adjusting a control panel parameter including a means for setting a desired illumination mode, wherein said partially illuminated mode comprises operation of said display means by changing from a partial light level to a full light level in response to actuation of said user interface, and returning to a partial light level that is less than said full light level after a desired period of inaction of said user interface.

13. The assembly as recited in claim 12, including a light sensing means for providing information indicative of light conditions surrounding said display means.

* * * * *